Feb. 10, 1970 P. G. STOCK 3,494,394
TRIMMER
Filed Feb. 9, 1967 2 Sheets-Sheet 1
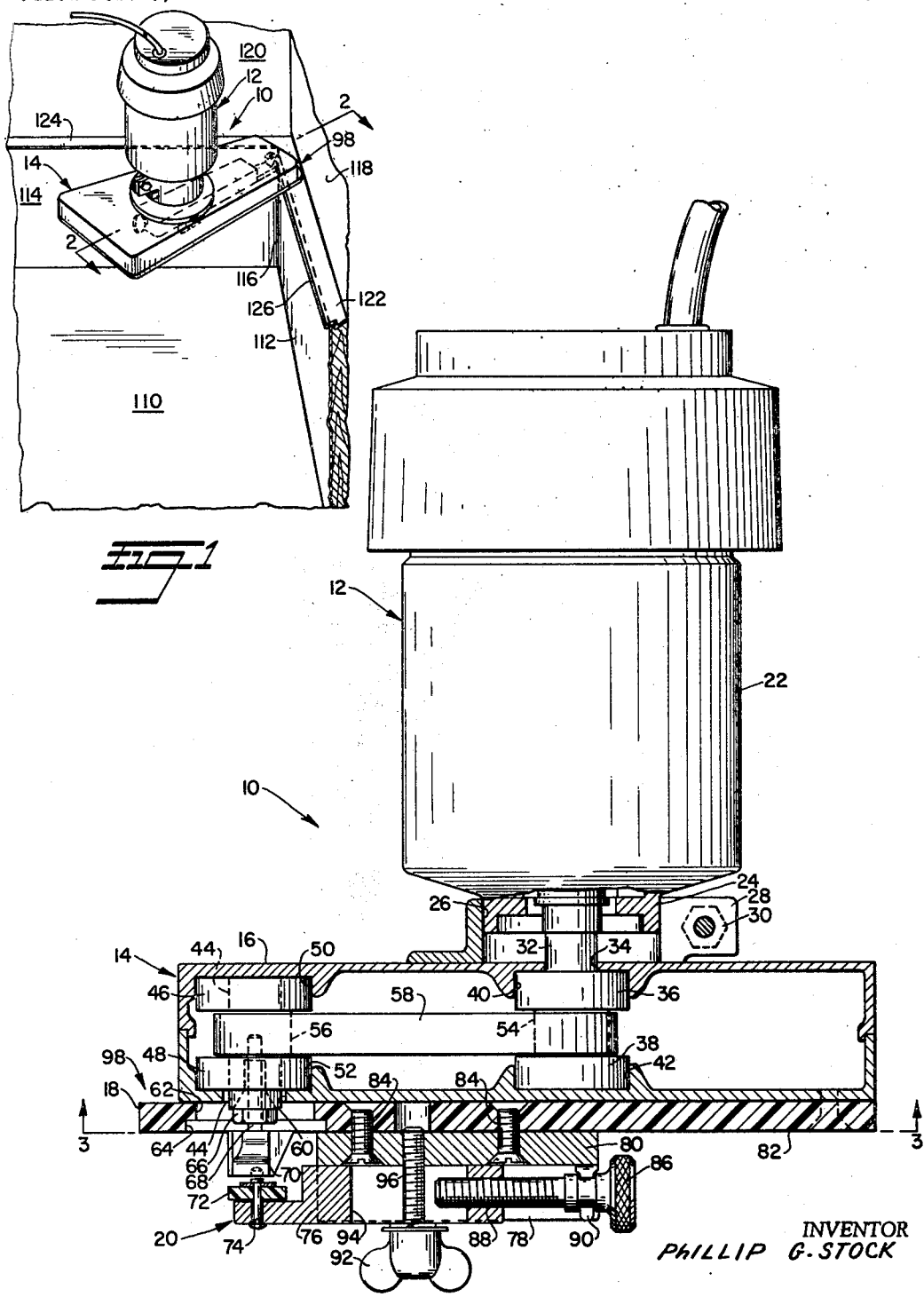
INVENTOR
PHILLIP G. STOCK
BY
Strauch, Nolan, Neale, Nies & Kurz
ATTORNEYS Feb. 10, 1970     P. G. STOCK     3,494,394
TRIMMER Filed Feb. 9, 1967     2 Sheets-Sheet 2

INVENTOR
PHILLIP G. STOCK

BY
Strauch, Nolan, Neale, Nies & Kurz
ATTORNEYS

United States Patent Office 3,494,394
Patented Feb. 10, 1970

3,494,394
TRIMMER
Phillip G. Stock, Sacramento, Calif., assignor to Rockwell Manufacturing Company, Pittsburgh, Pa., a corporation of Pennsylvania
Filed Feb. 9, 1967, Ser. No. 614,876
Int. Cl. B27c 5/10
U.S. Cl. 144—134                 9 Claims

ABSTRACT OF THE DISCLOSURE

An edge trimmer having a workpiece engaging base rotatably journalling an arbor. A bit which is preferably capable of making flush and bevel cuts is attached to the arbor and extends through the base adjacent one end thereof. Mounted on the base apart from and connected to the arbor as by a drive belt is a motor. A guide engageable with the workpiece edge is attached to the same side of the base as the bit, and its position relative to the latter can be adjusted.

BACKGROUND AND SUMMARY OF THE INVENTION

The present invention relates to improvements in power driven portable workpiece edge trimmers such as those frequently referred to as laminate trimmers. Edge trimmers of the type to which the present invention relates have in the past been usually attachments for convenetional routers. In conventional routers, the bit is mounted coaxial with and on the lower end of the shaft of the armature of the electric motor. Depth of cut is adjusted by raising and lowering the motor relative to the base. For edge trimming an arcuate guide such as a roller is mounted on the underside of the base below the lower end of the bit. An example of such structure is shown in United States Patent No. 2,839,107 issued June 17, 1958 to A. N. Emmons for "Combination Straight and Bevel Cutter."

One important difficulty with the prior art trimmer designs results from the fact that the size of the motor inherently establishes a minimum spacing from a wall at which an edge can be trimmed. For example, it is impossible with prior art trimmers to to trim laminate attached to the top edge of the back splash of a kitchen cabinet with the back splash in place, particularly in corners. This results from the fact that the cutting circle of the cutter is coaxial with and much smaller in diameter than the diameter of the motor housing and circular base plate for the unit. The difference in radius between the radius of the base plates and the radius of the cutting circle inherently establishes the minimum distance at which an edge may be trimmed from a surface extending generally parallel to the axis of the cutter.

A further deficiency of prior art edge trimmers results from the fact that the depth of cut adjustment requires raising and lowering of the motor relative to the base structure.

With these deficiencies of the prior art in mind, it is a primary object of the present invention to provide an improved trimmer in which the cutter and guide are disposed in offset relation to the motor and the cutter is journalled independently of the motor mounting so that the motor doesn't interfere with edge trimming movement of the cutter and guide into close proximity to a wall parallel to the cutter rotation axis.

A further object of this invention is to provide an improved edge trimmer in which the cutter is mounted upon an arbor journalled in spaced parallel relation to the rotation axis of the motor armature shaft whereby the depth of cut adjustment of the cutter can be shifted between flush and bevel cutting without disturbing the mounting of the motor.

These and other objects of the present invention will become more fully apparent by reference to the appended claims and as the following detailed description proceeds in reference to the accompanying drawings.

BRIEF DESCRIPTION OF THE DRAWING

FIGURE 1 is a perspective view of the edge trimmer of the present invention showing its use for trimming laminate attached to the top edge of a back splash;

FIGURE 2 is a partially sectional view of the trimmer of FIGURE 1, the section being taken substantially along the line 2—2 of FIGURE 1;

DESCRIPTION OF A PREFERRED EMBODIMENT

Figure 3:
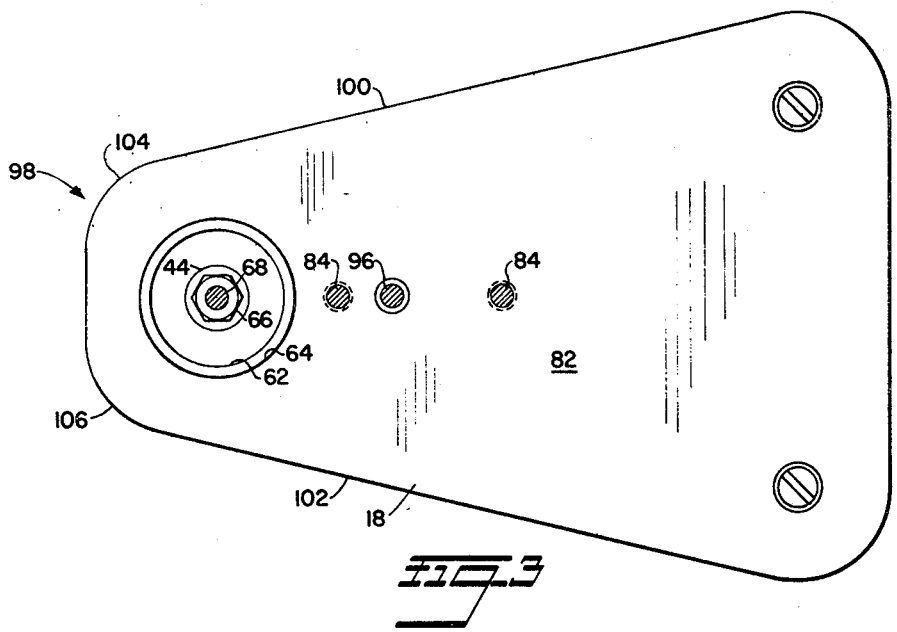
FIGURE 3 is a bottom view of the trimmer of FIGURES 1 and 2 taken substantially along the line 3—3 of FIGURE 2.

Referring now in detail to the drawings and particularly to FIGURE 2, the edge trimmer 10 there shown comprises an electric motor 12, a base structure 14 including an enclosed housing 16 and the base plate 18, and a guide assembly 20. The housing 22 of the electric motor 12 has an axially extending boss 24 extending in the opening 26 of a split clamp ring 28 fixed to the top of the housing 16 by means not shown. By manipulation of the bolt 30, the motor 12 is clamped by the clamp ring 28 to the housing 16. The armature (not shown) of the motor 12 is mounted on a shaft 32 journalled within the housing 22 and projecting from the lower end thereof through the opening 26 through an aligned opening 34 in the top wall of the housing 16. The shaft 32 is journalled within the housing 16 by a pair of aligned anti-friction bearings 36 and 38 mounted within opposed recesses 40 and 42 in the upper and lower walls of the housing 16.

At the opposite end of the housing 16 there is journalled an arbor or spindle 44 by suitable anti-friction bearings 46 and 48 mounted in aligned recesses 50 and 52 in the top and bottom walls of the housing 16. Between the bearings 36 and 38 a pulley 54 is fixed to the armature shaft 32 and between the bearings 46 and 48 a pulley 56 is fixed to the arbor 44. These pulleys 56 and 54 are interconnected by a suitable drive belt 58. The belt 58 and the pulleys 54 and 56 are preferably of the tooth type providing a non-slip shock absorbing drive connection between the armature shaft 32 and the arbor 44.

The lower end of the arbor 44 projects through an aligned aperture 60 in the bottom wall of the housing 16. The base plate 18 is formed with an aperture 62 and a counterbore 64 coaxial therewith in alignment with the opening 60 in the housing 16.

The arbor 44 is formed from its bottom end with a central bore threadedly receiving a clamping nut 66 which is centrally apertured and through which projects the shank 68 of a bit 70. Bit 70 may for example be of the type illustrated in United States Patent No. 2,839,107 issued June 17, 1958 to A. N. Emmons for "Combination Straight and Bevel Cutter." With the cutter 70 fully inserted into the bore within the arbor 44, the straight cutter is operative and a flush cut is achieved. With the cutter 70 in the lower position, the inclined cutter is operative and a bevel cut is achieved. It will be noted that this adjustment is made merely by manipulation of the nut 66 and shifting the cutter 70 axially with respect to the arbor 44 and then locking the nut 66. No movement of the motor 12 relative to the base 14 is required.

The guide structure 20 comprises a guide roller 72 journalled on a pin 74 mounted on a support 76 mounted for rectilinear movement within a rectilinear guideway 78 formed on the bottom of a guide block 80. The guide block 80 is fixed to the bottom surface 82 of the base plate 18 by screws 84. The guideway 78 is so constructed that the movement of the support 76 is radially of the axis of the arbor 44 and parallel to the surface 82 so that the guide roller 72 can be moved into axial alignment with the rotation axis of the arbor 44. This movement of the support 76 along the guideway 78 is controlled by rotary manipulation of the adjusting screw 86 which is threadedly engaged with the support at 88 and rotatably connected to the guide block 80 at 90. By this construction, the screw 86 can rotate but not move axially relative to the guide block 80. Rotation of the screw 86 thus speeds the support 76 along the guideway 78. When the required position of the support 76 is achieved, the support 76 is clamped in position to the guide block 80 by a locking screw 92 extending through the central through opening 94 in the support 76 and threadedly engaged at 96 with the guide block 80.

Figure 4:
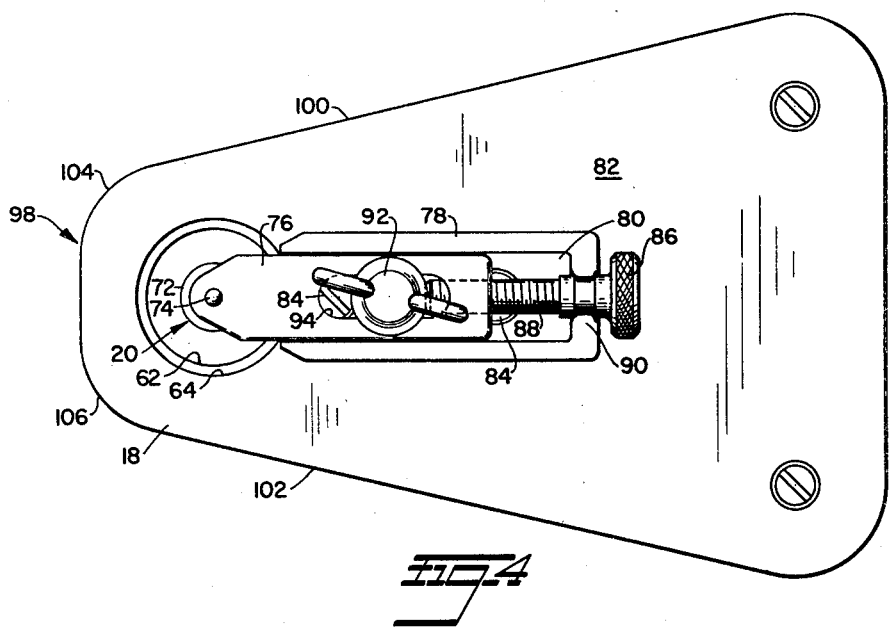
FIGURE 4 is a bottom view of the trimmer shown in FIGURE 2.

As is apparent from FIGURES 2, 3 and 4, the arbor 44 is journalled at a projecting nose portion 98 of the base plate 18. That nose portion is defined by a pair of converging edges 100 and 102 which are preferably straight and interconnected by arcuate portions 104 and 106. The motor 12 is located on the base structure 14 remote from this nose portion 98 and preferably in symmetrically spaced relation to the edges 100 and 102, that is the axis of the armature shaft 32 preferably intersects the surface 82 midway between the edges 100 and 102.

The support 76 and guide block 80 are mounted on the bottom of the base plate 18 on the side of the opening 62 therein away from the nose 98.

The advantage of the trimmer illustrated in this application over prior art trimmers such as that shown in the aforesaid Emmons patent is best illustrated in FIGURE 1. FIGURE 1 shows a counter top 110 having a pair of mutually perpendicular back splash pieces 112 and 114 forming an inside corner at 116. The wall of the room above the back splash pieces 112 and 114 is indicated at 118 and 120. For finishing purposes, strips of laminate material 122 and 124 are attached to the top edge of the back splash pieces 112 and 114. As originally attached these strips have a slight overhang beyond the vertical face of the back splash pieces 112 and 114 as indicated at 126. The problem is to trim this overhang 126 flush with the vertical surface of the back splash 112 and 114 either with a flush cut or a bevel cut. In prior art laminate trimmers, it has been extremely difficult to make this cut because the motor and the concentric base abut the vertical walls above the back splash and prevent the cutter from reaching the edge to be trimmed. As is apparent from FIGURE 1, with the cutter located at the nose portion 98 of the base structure 14 of the edge trimmer 10, the motor 12 does not approach the walls 118 and 120 and therefore does not interfere with the movement of the cutter 70 into cutting position to trim the overhanging edge 126. This problem has been particularly critical when using prior art edge trimmers when one is trying to trim the overhanging edge 126 into the corner 116.

Normally the thickness of the back splash is approximately ¾ inch. For this reason, the nose 98 should not project more than ¾ inch beyond the cutting circle of the bit 70.

From the foregoing it is apparent that the present invention eliminates the necessity of hand trimming an edge such as the overhanging edge 126 shown in the figure. In addition the present construction permits adjustment of the bit 70 between bevel and flush cutting positions without requiring movement of the motor 12.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A power driven edge trimmer or the like comprising:
   (a) a base having a planar bottom surface portion for contacting a workpiece and guiding a cutter relative thereto, said base having a nose defined by edge portions thereof;
   (b) a rotatable, cutter-supporting spindle mounted above said base at the nose thereof with its axis of rotation normal to the planar bottom surface portion of the base;
   (c) a motor attached to said base in a position remote from and above said nose;
   (d) a drive connection for transmitting power from said motor to said spindle;
   (e) said base having an opening through the planar bottom surface portion thereof in alignment with the spindle, whereby a cutter drive-connected to said spindle can extend through said base, said base protruding beyond said cutter-supporting spindle, whereby the movement of the cutter toward a structure extending above the workpiece is limited only by the configuration of the base;
   (f) a guide having an arcuate surface, said guide being adapted to engage said workpiece; and
   (g) means on said base at the side of said cutter opening remote from the nose of the base mounting said guide on said base in spaced relation to said planar bottom surface portion and in substantial alignment with said cutter opening, said last-mentioned means mounting said guide for movement toward and away from said nose in a path parallel to said planar bottom surface portion, whereby the position of said guide relative to the cutting arc of a cutter drive-connected to said spindle can be adjusted.

2. An edge trimmer or the like as defined in claim 1, wherein said base has a continuous edge delimiting the nose thereof, said continuous edge including a pair of converging straight portions symmetrically disposed on opposite sides of said cutter opening.

3. An edge trimmer or the like as defined in claim 1, wherein said motor has an output shafe mounted with its axis normal to the planar bottom surface portion of the base, whereby said output shaft and said spindle are journalled for rotation about spaced parallel axes and wherein said output shaft and said spindle are interconnected by a shock absorbing motion transmitting element.

4. An edge trimmer or the like as defined in claim 3, together with a first pully fixed to said motor output shaft and a second pulley fixed to said spindle and wherein said motion transmitting element is a belt drive-connecting said pulleys.

5. An edge trimmer or the like as defined in claim 1, wherein said spindle has a coaxial end opening at the end thereof adjacent said planar bottom surface portion which is adapted to receive the shank of a cutter and including means for engaging and securing said cutter in at least two different positions relative to said spindle.

6. An edge trimmer or the like as defined in claim 1, wherein said guide mounting means comprises a mounting block secured to the planar bottom surface portion of said base and having therein a rectilinear guideway extending parallel to said planar surface portion and normal to the axis of rotation of said spindle, a support block mounted in said guideway for rectilinear movement relative to said mounting block and supporting said guide at one end thereof beneath said cutter opening, means securing said support block in said guideway, and means fixing said guide to said support block, and including means for rectilinearly adjusting said support block relative to said mounting block to thereby adjust said guide relative to said cutter comprising a rotatable member fixed to one of said blocks and threaded into the other of said blocks and selectively releasable means for fixing the support block in the position to which it is adjusted relative to the mounting block.

7. An attachment for use with an electrical motor for edge trimming and the like comprising:
   (a) a base having a planar bottom surface portion for contacting a workpiece and guiding a cutter relative thereto, said base having a nose defined by edge portions thereof;
   (b) a rotatable, cutter-supporting spindle mounted above said base at the nose thereof with its axis of rotation normal to the planar bottom surface portion of the base;
   (c) means at a location remote from the nose of and above said base for fixing an electric motor thereto, whereby said spindle may be driven by said motor;
   (d) said base having an opening through the planar bottom surface portion thereof in alignment with the spindle, whereby a cutter drive-connected to said spindle can extend through said base, said base protruding beyond said cutter-supporting spindle, whereby the movement of the cutter toward a structure extending above the workpiece is limited only by the configuration of the base;
   (e) a guide having an arcuate surface, said guide being adapted to engage said workpiece; and
   (f) means on said base at the side of said cutter opening remote from the nose of the base mounting said guide on said base in spaced relation to said planar bottom surface portion and in a substantial alignment with said cutter opening, said last-mentioned means mounting said guide for movement toward and away from said nose in a path parallel to said planar bottom surface portion, whereby the position of said guide relative to the cutting arc of a cutter drive-connected to said spindle can be adjusted.

8. The attachment defined in claim 7, wherein said spindle has a coaxial end opening at the end thereof adjacent said planar surface portion which is adapted to receive the shank of a cutter and including means for engaging and securing said cutter in at least two different positions relative to said spindle.

9. The attachment defined in claim 7, wherein said guide mounting means comprises a mounting block secured to the planar bottom surface portion of said base and having therein a rectilinear guideway extending parallel to said planar surface and normal to the axis of rotation of said spindle, a support block mounted in said guideway for rectilinear movement relative to said mounting block and supporting said guide at one end thereof beneath said cutter opening, and means securing said support block in said guideway, means fixing said guide to the support block, and including means for rectilinearly adjusting said support block relative to said mounting block to thereby adjust said guide relative to said cutter comprising a rotatable member fixed to one of said blocks and threaded into the other of said blocks and selectively releasable means for fixing the support block in the position to which it is adjusted relative to the mounting block.

References Cited

UNITED STATES PATENTS

| | | |
|---|---|---|
| 2,610,658 | 9/1952 | Koeling. |
| 2,952,281 | 9/1960 | Weber. |
| 3,346,026 | 10/1967 | Pluchino _____ 144—144 |
| 2,839,107 | 6/1958 | Emmons. |

FOREIGN PATENTS

| | | |
|---|---|---|
| 981,146 | 1/1951 | France. |
| 542,165 | 4/1956 | Italy. |

DONALD R. SCHRAN, Primary Examiner

U.S. Cl. X.R.

90—12; 144—136